United States Patent [19]

Niemann

[11] Patent Number: 4,611,706
[45] Date of Patent: Sep. 16, 1986

[54] METHOD AND APPARATUS FOR PACKING FRUIT

[76] Inventor: Gary O. Niemann, 3204 E. Lake Hartridge Dr., NW., Winter Haven, Fla. 33880

[21] Appl. No.: 639,820

[22] Filed: Aug. 10, 1984

[51] Int. Cl.$^4$ ............................................. B65G 47/12
[52] U.S. Cl. ................................. 198/443; 198/690.2
[58] Field of Search ............... 198/699, 397, 396, 424, 198/550, 443, 448, 433, 452, 453, 820, 821, 504, 550.01, 690.2

[56] References Cited

U.S. PATENT DOCUMENTS

| | | | |
|---|---|---|---|
| 344,563 | 6/1886 | Channell | 198/821 |
| 861,214 | 7/1907 | Horn | 198/821 X |
| 931,991 | 8/1909 | Brooks et al. | 198/821 |
| 1,422,398 | 7/1922 | Wentz | 198/699 |
| 2,609,912 | 9/1952 | Engel | 198/397 |
| 3,070,210 | 12/1962 | Woodward, Jr. | 198/397 |
| 3,241,582 | 3/1966 | Belk | 198/504 X |
| 3,326,351 | 6/1967 | Ross et al. | 198/397 |
| 3,474,891 | 10/1969 | Kamila | 198/397 |

FOREIGN PATENT DOCUMENTS

| | | | |
|---|---|---|---|
| 1175604 | 8/1964 | Fed. Rep. of Germany | 198/397 |
| 58-216817 | 12/1983 | Japan | 198/397 |

*Primary Examiner*—Joseph E. Valenza
*Assistant Examiner*—Jonathan D. Holmes
*Attorney, Agent, or Firm*—Berman, Aisenberg & Platt

[57] ABSTRACT

Method and apparatus are disclosed for efficiently loading articles. In the preferred embodiment, the invention is useful for processing fruit and loading individual pieces of fruit into bags to contain a predetermined weight of the fruit. The apparatus includes a conveyor having cleats which are angled with respect to the direction of movement of the conveyor. This causes the fruit, or other articles, to be aligned along each cleat. As the cleat passes over an upper end of the conveyor, the fruit is individually discharged into a collecting device, such as a bag. The bag is preferably resting on a scale for indicating the weight of added fruit. In accordance with the disclosed method, a conveyor is operated for a predetermined period of time which automatically loads fruit into the bag to a total weight equal to or less than the desired weight for the bag. A timer then terminates operation of the conveyor, and an operator manually activates the conveyor to add single pieces of fruit until the minimum weight is reached.

8 Claims, 4 Drawing Figures

METHOD AND APPARATUS FOR PACKING FRUIT

FIELD OF THE INVENTION

This invention relates to methods and apparatus for packing individual items such as pieces of fruit.

BACKGROUND ART

When processing fruit, it is often necessary to place fruit in individual bags such that the weight of the fruit falls within a prescribed weight limit.

In one prior art system, fruit is separated according to diameter and an appropriate number of pieces of fruit falling within a given range of sizes is placed into a bag. According to this method, the bag is filled by count but sold by weight. This method relies upon the average weight of a piece of fruit, and many times fruit is wasted because the bag is overloaded to ensure a prescribed minimum weight for the fruit.

Many times, fruit is transported through a processing facility by conveyor belts.

U.S. Pat. No. 503,014 (Storms) shows a conveyor belt for use with a harvester or a grain binder. A moveable belt includes slats which extend diagonally across the belt. One end of each slat is relatively thick, and the remainder of the slat is thin. As grain is introduced to the belt, the thick ends of the slats engage the butts of the grain to carry the grain along the belt and deposit it in an elevator in the orientation required by a binder.

U.S. Pat. No. 3,070,210 (Woodward, Jr.) shows a parts elevator having a conveyor belt with flexible cleats attached to the strip diagonally with respect to the direction of the belt travel. As the belt passes through a hopper, the cleats engage objects and deposit them at a discharge point between the ends of the belt. At the discharge point, all of the objects slide off a cleat.

U.S. Pat. No. 3,613,862 (Stoppard) shows an apparatus for delivering elongate bobbins which includes a plurality of slanted trays attached to each other to resemble a conveyor belt. Each of the trays is designed to receive a single elongate bobbin and to move it between two locations.

U.S. Pat. No. 1,422,398 shows a conveyor belt having flexible cleats extending directly across the belt. The cleats comprise sections of flexible material which elongate as they pass over pulleys driving the conveyor belt.

SUMMARY OF THE INVENTION

Prior art methods of loading fruit waste a substantial amount of fruit because of the inability to accurately and efficiently measure the weight of the fruit being loaded into a bag. Efficiently loading fruit requires accurate control of feeding the fruit into a bag so that the weight of the bag is slightly greater than the mandated minimum weight.

A method according to the invention is to place fruit in a bag one-by-one and to indicate the weight of the bag as the fruit is being loaded. A timer controls a loading apparatus and is set to automatically load a bag for a time period such that the weight is slightly below the minimum weight of the bag. An operator then observes the weight indication and activates the loading apparatus to continue loading fruit into the bag until the minimum weight is reached, at which point the loading apparatus is turned off.

By this method, the operator need merely activate one switch which will automatically load the bag until a pre-selected time period has elapsed. While the bag is being automatically loaded, the operator can attend to other tasks such as operating other loading apparatus, and need only pay attention to the first loading apparatus when the initial time period has elapsed. The operator then adds only a few pieces of fruit so that the minimum weight of the bag is achieved and overloading is avoided.

An apparatus in accordance with the invention comprises a conveyor belt having cleats which extend at an angle with respect to the direction of motion of the belt. An inlet hopper directs fruit onto the belt, and the cleats engage the fruit in such a manner that they are aligned along the cleat. Discharge takes place over an upper end of the conveyor belt, and since the fruit are aligned diagonally across the belt, individual pieces of fruit are discharged over the upper end. This allows the operator to add single pieces of fruit to the bag by simply advancing the conveyor belt.

Each of the cleats is preferably made of a hollow, flexible tube which deforms as it passes over the upper end of the conveyor belt. A second hollow, flexible tube is located along one side of the conveyor belt and acts as a bumper for fruit to prevent the fruit from rubbing against a stationary side frame of the apparatus.

The weighing scale is preferably arranged so that the weight read-out will be zero when an empty bag is placed on the platform. Thus, a platform for a five-pound bag weighs three pounds more than the platform for an eight-pound bag and the scale need not be adjusted for bags of different sizes.

An object of this invention is to provide a method for loading articles into a container to provide a predetermined total weight of the container and articles.

A further object of this invention is to provide a method for loading individual pieces of fruit into a bag to achieve a predetermined minimum weight of fruit.

A still further object of this invention is to provide an apparatus for loading individual pieces of fruit into a bag.

Yet another object of this invention is to provide a conveyor having diagonally-oriented cleats for allowing discharge of individual pieces of fruit.

DETAILED DESCRIPTION OF THE INVENTION

Figure 1:
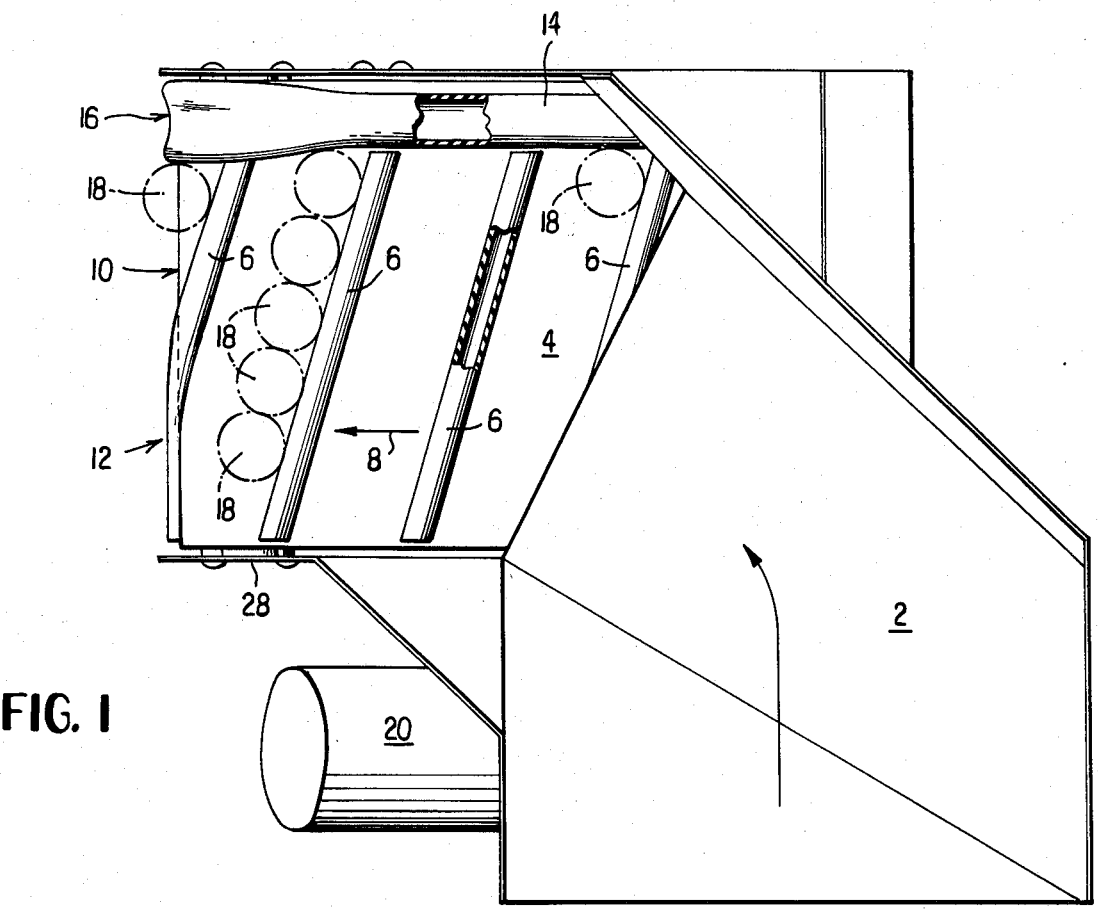
FIG. 1 is a top view of an apparatus in accordance with the invention.

FIG. 1 is a top view of a preferred embodiment of the invention. An inlet chute 2 directs articles, preferably fruit, to an upwardly inclined conveyor belt 4. The conveyor belt 4 includes a plurality of cleats 6 which are mounted to the conveyor belt for movement therewith. The conveyor belt 4 moves in a direction indicated by arrow 8, and the cleats extend across the conveyor belt 4 at an angle with respect to this direction of movement. The cleats are preferably hollow, flexible tubes which collapse as they pass over an upper end 10 of the conveyor belt. This collapsing is illustrated by deformation of a cleat 6 at upper end 10 and is indicated by arrow 12.

A bumper 14 is attached to one side of the conveyor belt 4 and moves with it to prevent fruit carried by the conveyor belt from being damaged by contact with a stationary side frame element. The bumper 14 is preferably of hollow, flexible material which allows it to deform as illustrated by arrow 16 as it passes over the upper end 10 of the conveyor belt.

Because the conveyor belt 4 is inclined with respect to the horizontal, and the cleats 6 are inclined with respect to the direction of motion of the conveyor, articles 18, such as pieces of fruit, will automatically align along an upper edge of a cleat 6. The size of cleats will depend upon the dimensions of the articles to be conveyed, and the height of a cleat above the conveyor belt 4 must be large enough so that the cleat carries an article as the conveyor belt moves.

When a load of objects is placed in the inlet chute 2, the cleats 6 automatically engage a plurality of the objects in such a manner that they align themselves along the cleats 6 as shown in FIG. 1.

The angled orientation of the cleats 6 causes articles 18 to be aligned and to pass over the upper end 10 of the conveyor one-at-a-time. The article at the uppermost end of a cleat reaches end 10 of the conveyor belt first, and each other article reaches end 10 at a respective subsequent time.

The conveyor 4 is driven by a motor 20 through a gear arrangement.

Figure 2:
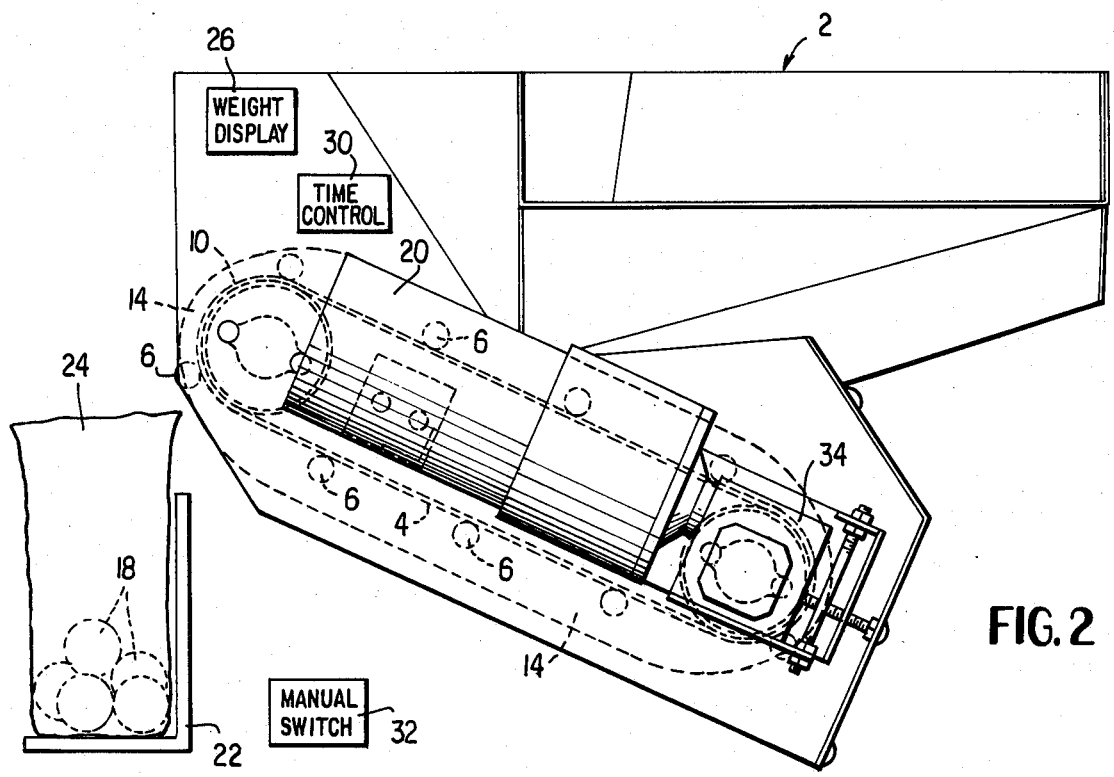
FIG. 2 is a side view of an apparatus in accordance with the invention.

FIG. 2 is a side view of the apparatus shown in FIG. 1, and also includes a side view of a scale 22 which supports and weighs a bag 24. The scale 22 is located with respect to the upper end 10 of the conveyor such that individual articles passing over the upper end 10 fall directly into the bag 24. As noted above, with respect to FIG. 1, the orientation of the cleats 6 causes the articles to pass over the upper end 10 one-at-a-time, thus causing articles 18 to fall into bag 24 one-at-a-time. The weight of the bag 24 is displayed by a weight display 26, which is shown attached to a side wall 28 of the frame supporting the conveyor 4. Of course, the weight display may be located at any position convenient for observation by an operator.

A time control mechanism 30 controls the duration of an operating cycle of the conveyor 4. The manual switch 32 is readily accessible by an operator and is preferably a foot switch.

In operation, the time control is set in accordance with the average size of articles 18 and the desired minimum weight of bag 24. The conveyor is driven in direction 8 to automatically load articles 18 into the bag 24. When the pre-determined time period has elapsed, the time control turns off the motor 20, and the operator is alerted, for example, by an audible signal. The operator then observes the weight display 26 which will indicate that the bag has reached either the minimum weight for the bag or is just below the minimum weight. The operator then operates the manual switch 32 to cause individual articles 18 to fall into bag 24 until the weight display 26 shows a weight above the minimum weight, at which time the operator turns off the motor 20 by manual switch 32, removes loaded bag 24 from scale 22 and places an empty bag 24 on the scale. The sequence of steps is then repeated.

By this operation, the operator can easily load standard-sized bags, for example, five-pound bags, ten-pound bags, etc. to an accurate minimum weight.

The scale 22 is preferably weighted for use with a certain size bag so that the weight display 25 reads zero when empty bag 24 is placed on the scale 22.

Figure 3:
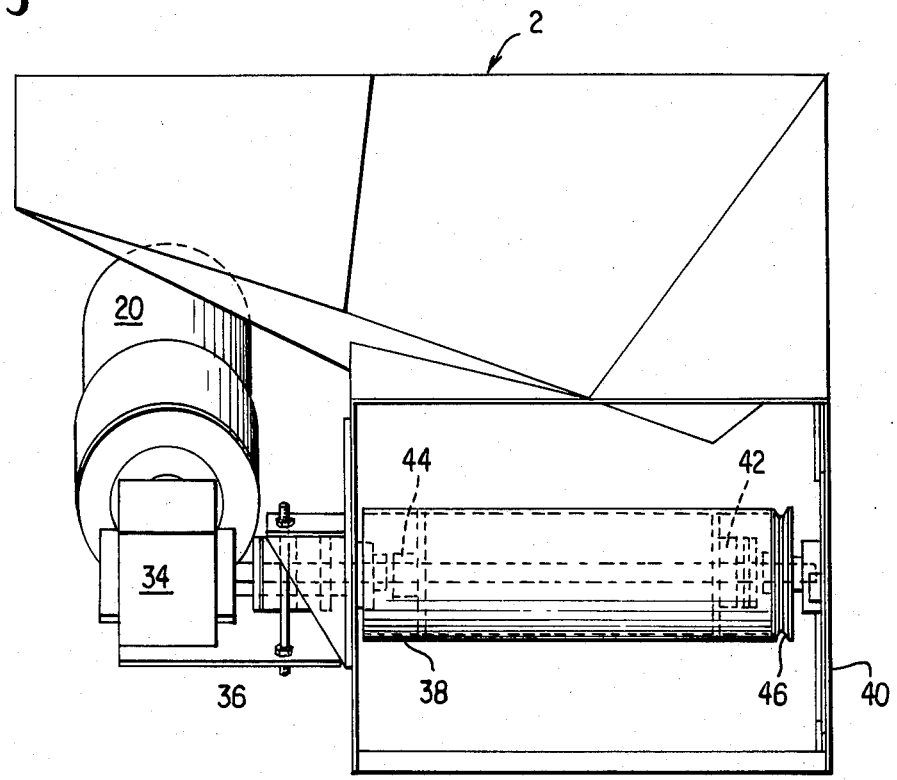
FIG. 3 is an elevational view of one end of an apparatus in accordance with the invention.

FIG. 2 shows a gear box 34 for receiving an input from the motor 20 and driving the conveyor belt 4 by its output shaft (see FIG. 3).

FIG. 3 is an end view of the apparatus shown in FIGS. 1 and 2, but in order to illustrate the driving mechanism, the conveyor belt 4 has not been shown. An output shaft 36 extends outwardly from the gear box 34. A drum 38 is mounted to a frame 40 and includes bearings 42 and 44 for allowing the drum to rotate with respect to the frame. Shaft 36 is connected to the drum 38 in a conventional manner and thus drives the drum. A V-shaped notch 46 is located at one end of the drum 38 for engaging a complimentarily-shaped portion of the belt 4.

Figure 4:
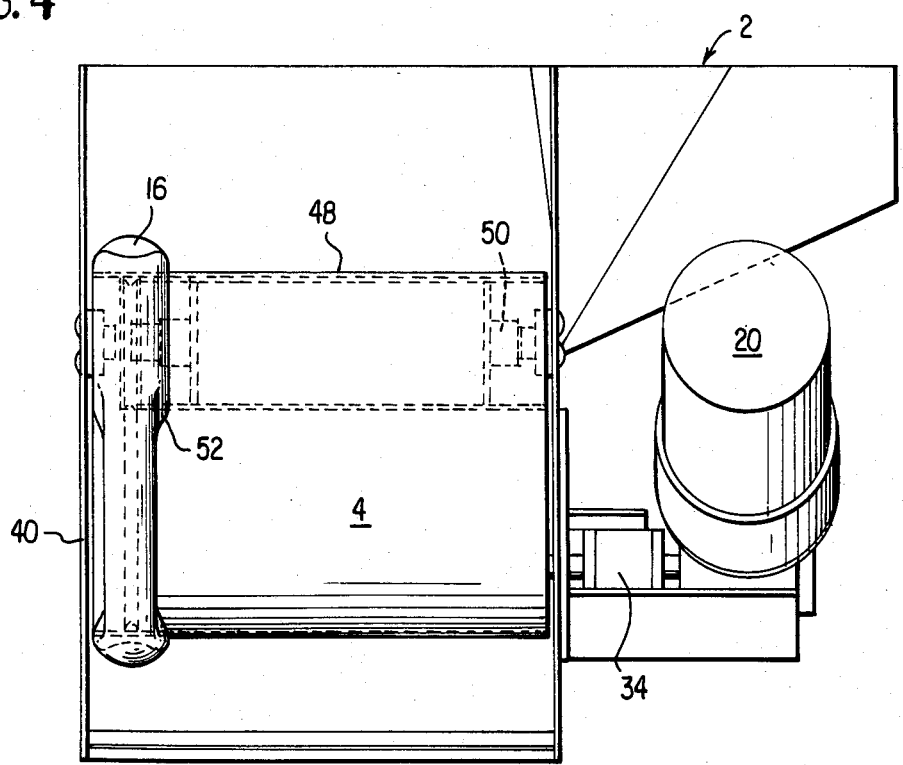
FIG. 4 is an elevational view of an opposite end of an apparatus in accordance with the invention.

FIG. 4 shows an opposite end of the apparatus shown in FIG. 3. An upper drum 48, shown in dashed lines, is mounted to the frame 40 by bearings 50 and 52, as is known in the art.

It will be appreciated that method and apparatus has been described wherein loading articles is greatly simplified and will result in a bag being loaded to a weight extremely close to the minimum desired weight. Obvious modifications within the scope of the following claims will be apparent to those of skill in the art.

What is claimed is:

1. Apparatus for delivering a plurality of objects sequentially comprising:

conveyor means for carrying said objects, said conveyor means comprising belt means for providing a moving surface in a first direction and oriented at an angle with respect to the horizontal, said belt means comprising a continuous, flexible belt, discharge means at an upper end of said conveyor means which is higher than any adjacent portion of said belt means, a plurality of cleat means for engaging said objects and for receiving a plurality of said objects side-by-side along each individual one of said cleat means, said plurality of cleat means being attached to an outer surface of said belt means for movement therewith and each individual cleat means being at a non-zero angle to said upper end of said conveyor means, and bumper means attached to an edge of said belt means adjacent the lower ends of said plurality of cleat means for preventing movement of said objects beyond said edge, whereby said objects are discharged in sequence over said upper end of said conveyor means.

2. Apparatus according to claim 1 wherein said cleat means comprises a flexible tube which deforms at said upper end.

3. Apparatus according to claim 2 wherein said cleat means comprises a plurality of said flexible tubes spaced along said belt means and parallel with each other.

4. Apparatus according to claim 1 wherein said bumper means is a flexible tube which deforms at said upper end.

5. Apparatus according to claim 1 further comprising inlet means for directing a plurality of said objects to a portion of said conveyor means below said upper end.

6. Apparatus according to claim 1 further comprising weighing means for receiving sequentially a plurality of said objects.

7. Apparatus according to claim 6 further comprising timing means for operating said conveyor means for a predetermined period of time and then terminating said operation.

8. Apparatus according to claim 7 further comprising means for manually restarting said operation after said timing means has terminated said operation.

* * * * *